United States Patent [19]

Hansen et al.

[11] Patent Number: 4,951,472
[45] Date of Patent: Aug. 28, 1990

[54] PROCESS AND APPARATUS FOR PRODUCING PARTICULATE FROZEN HIGH WATER CONTENT FOOD PRODUCTS

[75] Inventors: Ove Hansen, Columbia, Md.; G. Skov Nielsen; Brian Wagstaff, both of Hudson, Wis.

[73] Assignee: Niro Atomizer, Inc., Soborg, Denmark

[21] Appl. No.: 390,870

[22] Filed: Aug. 8, 1989

[51] Int. Cl.⁵ ............................................. F25D 13/06
[52] U.S. Cl. .......................................... 62/63; 62/57; 62/380
[58] Field of Search .............................. 62/57, 63, 380

[56] References Cited

U.S. PATENT DOCUMENTS

| | | | |
|---|---|---|---|
| 3,040,438 | 6/1962 | Perlman et al. | 34/57 |
| 3,169,381 | 2/1965 | Per-Oskar Persson | 62/57 |
| 3,239,942 | 3/1966 | Mink et al. | 62/57 |
| 3,425,237 | 2/1969 | McLeese | 34/164 |
| 3,512,267 | 5/1970 | Eichholz et al. | 34/164 |
| 3,691,644 | 9/1972 | Schnitzer | 62/57 |
| 3,865,965 | 2/1975 | Davis et al. | 426/519 |
| 3,982,404 | 9/1976 | Overbye | 62/57 |
| 4,305,210 | 12/1981 | Christensen et al. | 34/57 |
| 4,478,861 | 10/1984 | Montgomery et al. | 426/295 |
| 4,715,188 | 12/1987 | Enkegaard | 62/63 |
| 4,753,815 | 6/1988 | Kielsmeier et al. | 426/582 |

FOREIGN PATENT DOCUMENTS 995742 6/1965 United Kingdom.
2039015A 7/1980 United Kingdom.

OTHER PUBLICATIONS

Niro Atomizer Bulletin, "Vibrated Fluid Bed", for Vibro Fluidier M-80 Series No. 43.
Niro Atomizer Bulletin, "Cleaning-in-Place (CIP) Nozzle".

*Primary Examiner*—Ronald C. Capossela
*Attorney, Agent, or Firm*—Armstrong, Nikaido, Marmelstein, Kubovcik, Murray

[57] ABSTRACT

Particulate granules of a high water content food such as cheese are frozen in a freezing chamber having a perforated bottom plate. The bottom plate is vibrated to develop an oscillating movement while simultaneously introducing a chilled gas through the perforated plate to partially levitate the granules as they are moved through the freezing chamber by the combined action of the oscillating bottom plate and the chilled gas.

16 Claims, 1 Drawing Sheet

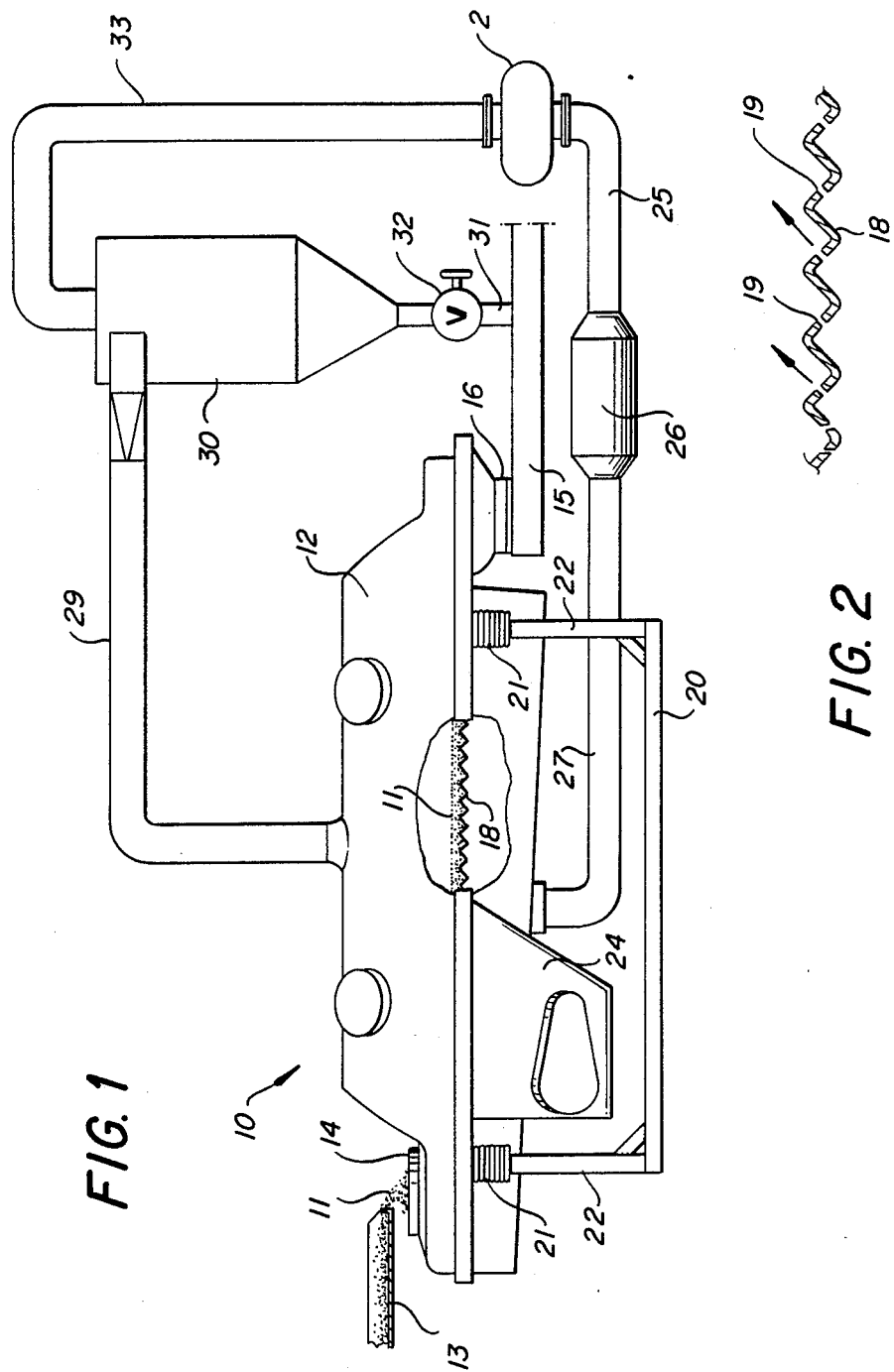

PROCESS AND APPARATUS FOR PRODUCING PARTICULATE FROZEN HIGH WATER CONTENT FOOD PRODUCTS

The present invention relates to the production of particulate frozen food products and, more specifically, to a process and apparatus whereby particulate high water content food products are frozen while being partially levitated by a refrigerated gas and moved in oscillatory motion.

BACKGROUND OF THE INVENTION

Processes used in the production of frozen foods are highly specialized and specifically designed to optimize the appeal and sales value of a particular product. Heat transfer may be accomplished by direct contact of a food product or packaged food product with a refrigerant or by contact with a refrigerated gas or liquid. The process used for a particular food product depends to a large extent on the type of product, the water content of the product and the manner in which the food product is to be delivered to and prepared by a consumer.

Frozen meat and fish products are generally prepackaged before freezing to reduce water loss from the product during the freezing process and protect against freezer burn.

Relatively large food products, such as green peas, string beans, and the like, are generally pre-packaged and frozen by a blast of refrigerated gas. Any water that is removed from the product during the freezing process is retained in the package and the individual food particles are often frozen together in a solid mass. However, such a condition of this type of frozen food product is not a matter of customer concern since these products are usually heated in preparation for use and the individual food particles separate during such preparation.

Prior art processes utilize various means including belts and trays as well as fluidized beds for the conveyance of the food products being frozen in such a manner that the products will be exposed to the freezing medium. U.S. Pat. No. 3,169,381 discloses an apparatus and method for freezing solid food particles by creating a fluidized bed by introducing such particles to a vessel and forcing refrigerated gas upwardly through the particles which are then moved in the direction of a vessel outlet by continuously introducing the feed product to create a fluid head at one end of the vessel. U.S. Pat. No. 3,865,965 discloses a method of cooling previously heated or "blanched" vegetables which utilizes a vibrating or reciprocating fluidized bed frame prior to subjecting the vegetables to a freezing operation. United Kingdom Patent Application GB No. 2039015 discloses a two-stage freezing process which includes a reciprocating and pivoting conveyor for delivering food products having a relatively high water content to a fluid bed which constitutes the first or preliminary freezing stage.

Thus many various approaches have been developed in the prior art to accommodate specific problems encountered with various types of food products and the manner in which they will be prepared. Basic considerations such as, equipment costs, economics of obtaining satisfactory heat transfer and the cost of maintaining a sanitary operation are important factors in the process selection for each type of food product.

Customer acceptance of various frozen dairy products depends greatly not only on the specific composition of the product but also on the nature of the frozen water content and on its distribution in the product. For example, if ice cream compositions are not adequately mixed by a shearing action during the freezing process, water tends to separate from the mixture and form large unpalatable crystals which are generally undesirable to a consumer. Rapid freezing tends to form small crystals of water in the frozen product.

Cheese is another dairy product, at least 30% water by weight and usually higher, which poses unique problems for specific applications of the food product. Cheese of the type used on pizzas as well as other pasta products is usually prepared in granular form. Fresh cheeses have long been preferred in the preparation of pizza both from the standpoint of good appearance and physical quality of the finished baked product. However, fresh cheese granules, particularly those comprising mozzarella cheese or a blend of mozzarella cheese with other cheese, tend to stick together making it difficult to evenly spread the cheese granules on the pizza during preparation for baking and this detracts from the appearance and quality of the baked product.

With the growing popularity of pizza, both freshly prepared and frozen pizzas, a need has been recognized to produce improved free flowing frozen particulate cheese products. Specifically, there is a need to produce free flowing granules of cheese that can be readily handled in the process of making the pizzas and of such a quality that they can be baked on the pizzas in a frozen or partially frozen condition while obtaining as good a quality of baked pizza product as when fresh or fully thawed granule cheese is used. The desirability and use of frozen particulate granules of cheese in the preparation of pizza are described in U.S. Pat. No. 4,753,815. The use of commercially available equipment for freezing "comminuted cheese" of the type sold for individual quick freezing of food products is also disclosed in that patent. However, notwithstanding the availability of prior art equipment for individual quick freezing of other types of food products, there is a recognized need for improved methods for producing individual free flowing particulate granules of cheese including mozzarella cheese of the type used in the preparation of pizzas.

The present invention provides an improved process and apparatus for the manufacture of particulate frozen food products and, more specifically, the manufacture of particulate frozen food products having a high water content.

One object of the present invention is to provide an improved process for producing frozen cheese granules for use in making pizza products.

A further object of the present invention is to provide a process for producing frozen cheese granules of the kind useful for making pizzas which process maintains both the moisture content and the nature of the moisture contained in the fresh cheese granules before freezing.

It is a still further object to provide a process for producing particulate frozen granules of high water content food products wherein substantially all feed material is recovered as a marketable product.

It is a still further object of the present invention to provide process equipment for the manufacture of particulate granules of high water content food products that is uniquely capable of being cleaned in place and also meets food grade standards for producing dairy products.

It is a still further object of the present invention to provide a process for producing frozen cheese particles having product performance properties, when used in baked goods, that are essentially equivalent to those properties obtained as a result of using fresh cheese granules.

SUMMARY OF THE INVENTION

A process for freezing particulate granules of high water content food products, which includes: providing a freezing chamber having a feed inlet, an outlet and a perforated plate extending from the feed inlet to the outlet, oscillating the perforated plate, introducing a chilled gas through the perforated plate, delivering particulate granules of the food product to the feed inlet, oscillating the food granules while simultaneously levitating and freezing the particulate granules in the chilled gas, and moving the particulate granules to the outlet by the oscillating movement of the perforated plate.

In a preferred embodiment the perforated plate includes a plurality of gas entry ports oriented in the direction of the freezing chamber outlet. The chilled gas is introduced through the gas entry ports in the direction of the freezing chamber outlet to assist in moving the particulate material to the outlet.

In the preferred embodiment, the chilled gas is withdrawn from the freezing chamber and fine particles of the food product entrained in said chilled gas are recovered.

The preferred embodiment of the process is used for freezing particulate granules of a high water content food product which includes at least one type of mozzarella cheese.

In the preferred embodiment, the temperature of the chilling gas introduced through the perforated plate is maintained at a temperature between $-40°$ C. and $-50°$ C., the temperature of the frozen particulate granules is maintained between $-14°$ C. and $-30°$ C. and the perforated plate is oscillated at a rate greater than 600 cycles per minute.

The apparatus of the present invention is utilized for freezing particulate granules of high water content food products and includes: a freezing chamber having a feed inlet, an outlet and a perforated bottom plate extending from the feed inlet to the outlet, a device for oscillating the perforated plate, a source of chilled gas, an arrangement for moving the chilled gas through the perforated plate, a device for delivering particulate granules of the food product to the feed inlet to provide a bed of the particulate granules adjacent the perforated bottom plate, a fines separator, and conduit for withdrawing the chilled gas from above the bed of particulate granules in the freezing chamber and delivering the chilled gas to the fines separator. The chilled gas freezes the levitated particulate granules as individual entities in the bed. The bed of particulate granules is moved toward the outlet by oscillating movement while being levitated by the combined action of the oscillations as well as the directed gas flow through the particulates. The fine particles of said particulate granules entrained in the chilled gas are recovered in the fines separator.

In the preferred embodiment, the fines separator is a cyclone, and the perforated bottom plate includes a plurality of gas entry ports oriented to introduce the chilled gas into the freezing chamber to levitate the particulate granules and induce movement of the particulate granules toward the outlet whereby the particulate granules are moved toward the outlet by the chilling gas and the oscillating movement of the perforated plate.

The present invention and the advantages provided thereby will be more fully understood with reference to the following detailed description of the preferred embodiment taken in conjunction with the accompanying drawings.

BRIEF DESCRIPTION OF THE DRAWINGS

FIG. 1 is a diagrammatic and schematic illustration, partly in section, of the apparatus of the present invention which is utilized to practice the process of the present invention; and FIG. 2 is an enlarged view showing details of one of the elements of FIG. 1.

DESCRIPTION OF THE PREFERRED EMBODIMENT

With reference to the drawings wherein like reference numerals designate the same or like parts throughout, there is shown in FIG. 1 a closed freezing chamber generally designated by the reference numeral 10 which has an outer housing 12, a feed inlet 14 and a product outlet 16. A perforated "bottom plate" 18 is provided internally of the freezing chamber 10 and extends from the feed inlet 14 to the outlet 16. The bottom plate 1B, as best shown in FIG. 2 is preferably of a corrugated or wavy cross-section having a plurality of gas passage ports 19 as more fully described in U.S. Pat. No. 4,305,210, incorporated herein by reference. The bottom plate may be provided as a pre-formed Gill plate.

The outer housing 12 of the freezing chamber 10 is suspended for movement relative to a frame 20 by means of springs 21 interposed between the uprights 22 of the frame 20 and a flanged portion of the outer housing 12. The outer housing 12 and the bottom plate 18 secured thereto are thus suspended by means of the springs 21 for oscillating movement relative to the frame 20 under action of a vibrator 24 provided as an integral part of the freezing chamber 10. The term "oscillation", as used in defining the present invention, refers to a vibratory motion of a bottom plate such as the bottom plate 18 that tends to lift and move or progress material in a desired direction. The freezing chamber 10 may be provided in the form of a M-80 series vibrated fluid bed having cleaning in place capability as marked by NIRO ATOMIZER, INC. of Columbia, Md. with the vibrated bed used only to oscillate and partially levitate the particulate granules and not to provide a fluidized bed of the granules. The gas flow required to "fluidize" the particulate granules would be much greater than the chilled gas flow of the present invention which serves to lift the granules without developing a fluidized bed.

A gas chilled by a heat exchanger 26 is introduced to the freezing chamber below the perforated bottom plate 18 so as to pass through the ports 19 provided in the bottom plate 18. The gas entry ports 19, as shown by the arrows in FIG. 2 are oriented so as to direct the gas both vertically and horizontally in the direction of the outlet 16.

A conduit 29 is provided for withdrawing gas introduced through the ports 19 in the perforated bottom plate from the interior of the housing 12 and delivering the same to a fines separator in the form of a cyclone 30.

The cyclone 30 is connected by means of an outlet conduit 31 and a valve 32 to a product discharge duct 15 and by means of a conduit 33 to a blower 28.

The operation of the apparatus shown in the drawings will now be described. The blower is actuated to create a flow of air through the conduit 25 to the heat exchanger 26 where the gas is chilled and delivered by means of conduit 27 to the interior of the freezing chamber 10 below the perforated "bottom plate" 18. The conduit 27 is shown connected to the bottom of the outer housing 12 for purposes of illustration, however, it is preferred to introduce the chilled gas horizontally through side inlets in the outer housing 12 to provide improved gas distribution beneath the perforated bottom plate 18.

The vibrator 24 is actuated to induce oscillatory movement of the outer housing 12 and perforated bottom plate 18 relative to the uprights 22 of frame 20.

Feed material in the form of particulate granules 11 of a high water content food product such as, for example, a cheese or a mixture of cheese is then provided by feeder 13 to the freezing chamber inlet 14. The particulate granules 11 fall down to the vicinity of the perforated bottom plate 18. However, the force of the chilled gas delivered by conduit 27 through the gas entry ports 19 of the bottom plate 18 is sufficient to partially levitate the particulate granules 11 and lift the granules adjacent the perforated bottom plate 18. Moreover, since the perforated bottom plate 18 is oscillating as a result of actuation of the vibrator 24 the oscillatory movement of the perforated plate 18 together with the movement of the chilled gas passing through the ports 19 maintain the particulate granules separate as individual entities while simultaneously moving the granules in the direction of the outlet 16 where they are discharged as frozen particulate granules into a product discharge conduit 15.

The chilled gas introduced through the conduit 27 is withdrawn from above the bed of particulate granules adjacent the perforated bottom plate 18 through a conduit 29 and delivered to a fines separator in the form of a cyclone 30. In the cyclone 30 the fine particles entrained in the chilled gas withdrawn through conduit 29 are separated and returned by means of the outlet conduit 31 to the product discharge conduit 15 thus returning virtually all of the feed material delivered by the feeder 13 to the product discharge conduit 15. After separation of the fine particles, the gas delivered to the cyclone 30 is returned through conduit 33 to the blower 28 where it is accelerated and delivered to the heat exchanger 26 thus providing a closed system and a continuous cycle of chilling gas and fines recovery.

The temperature of the chilling gas delivered through the conduit 27 is preferably maintained at a temperature between −40° C. and −50° C. and the temperature of the frozen particulate granules is preferably maintained between −14° C. and −30°C. The temperature of the frozen particulate granules can be controlled within certain limits by adjusting both the velocity and temperature of the chilling gas delivered through conduit 27 and the oscillation rate of the vibrator 24. Generally speaking it is preferred to operate the vibrator to induce oscillatory movement of the housing 12 at a rate between 450 and 800 cycles per minute. The residence time of particulate granules of a food product including at least one type of mozzarella cheese is preferably between about 3 and 10 minutes with the inlet temperature of the chilling gas between −30° C. and −50° C. and an oscillation rate greater than about 600 cycles per minute.

The advantages offered by the process of the present invention when practiced using apparatus such as that shown by the drawings will be readily appreciated after consideration of the following comparative tests which were conducted using some or all of the parameters of the present invention.

Test 1

A pilot unit having a one square meter bed area was set up in accordance with the schematic and flow diagram as shown by FIG. 1. A mozzarella cheese made from 3% fat milk comprising 18% fat, 28% protein and 54% water was used as a test material. The cheese was diced at room temperature in the form of approximately ¼ inch cubes, chilled air flow at the rate of 10,000 kg per hour was initiated and continued until the exit air from the freezing unit attained a temperature of −45°C. The diced cheese was then introduced at the rate of 1,000 kg per hour. The purpose of this test was to determine whether or not the cheese dices would fluidize and pass through the unit as a fluid during the freezing process. After approximately ten minutes operation it was evident that the material was not being fluidized and the test was terminated. The unit was opened for inspection and the feed material was found randomly frozen in large chunks in a mound near the feed inlet to the freezing chamber.

Test 2

Conditions used for this Test 2 were identical to those of Test 1 with the exception that oscillation of the bed was initiated at 450 cycles per minute before the feed material was introduced. This oscillation rate was such that particulate material would pass through the unit in about 4 minutes elapsed time.

About 6 minutes after feed material was first introduced, frozen product began to be discharged from the unit. After about one hour of operation, steady state operation was attained such that feed input weight was equal to product output weight and the gas exiting the bed and the frozen product granules had a temperature of −25°C. The outlet gas temperature was about −19°C.

Approximately 2% of the feed material fed was entrained as fines in the overhead chilling gas and was recovered as product by the cyclone. The product was free flowing and had essentially the same water content as the feed material.

Test 3

The conditions used for Test 3 were identical to those used for Test 2 with the exception that the rate of oscillation of the bed was set at 200 oscillations per minute. When equilibrium was reached at this oscillation rate it was noted that a small extent of particle to particle agglomeration was being produced. This test demonstrated that for the particular feed material used in this test that there was a minimum amount of mechanical oscillating motion necessary to maintain individual particle entity during freezing in the practice of this process.

Test 4

This test was conducted using the same type of cheese as in Test 1 with the exception that the cheese was formed into rods ¼″ inch in diameter and approximately ⅛" long. As in Test 1 it was found that these particles did not fluidize and flow like a liquid through the unit when the bed was stationary. After about ten minutes of operation the unit was opened for inspection and it was found that the feed material had frozen in large chunks and was not fluidized in the chamber.

Test 5

The conditions used in test 5 were identical with those of test 4 with the exception that before feed material was introduced the bed was put into oscillatory motion at 600 cycles per minute. The system came to apparatus equilibrium in about 10 minutes with a feed rate of 1,000 kg per hour and a product outlet temperature of −25°C. The product was free flowing with no indication of particle to particle agglomeration. It was determined that approximately 4% of the feed material was entrained as fines in the exit gas from the freezing chamber and recovered as product by the cyclone.

According to the present invention, as clearly evidenced by the foregoing tests, there is provided a process for freezing particulate granules of a cheese or a cheese blend by mechanically oscillating a perforated bed through which a plurality of oriented refrigerated gas streams are passed in sufficient quantity to at least partially levitate the granules as they progress through the system. This process is critically dependent upon and maintains the particulate granules as individual entities as they are being frozen and progress through the freezing chamber.

It is well known that high water content particulates in a quiescent mass tend to adhere strongly to one another when in a freezing environment. Elongated cord-like particulates and diced forms of cheese such as the mozzarella cheese used in the manufacture of pizza are prone to stick or to adhere to each other even at room temperature and form a solid mass if frozen in a quiescent state. The process and apparatus of this invention avoids this undesirable tendency of particulate granules of cheese to adhere together at room temperature and agglomerate in solid masses when frozen by providing both a process and apparatus to maintain the particulate granules in motion, each relative to the other as they are being frozen.

The process of the present invention also facilitates recovery of any fine particles that may be entrained in the chilling gas thus providing substantially 100% of the feed material as a marketable product.

The process and apparatus of the present invention are also advantageous in that the apparatus required to practice the process can be readily cleaned in place to meet American 3A Dairy Food Standards. In order to further facilitate maintaining dairy standards of sanitation, it is also preferred that the equipment employed in practicing this invention be housed in a cold room so that the freezing chamber does not require insulation.

Although a single preferred embodiment of the invention has been disclosed, the present invention is not to be construed as limited to the particular form disclosed herein since the foregoing description is to be regarded as illustrative rather than restrictive and it should be understood that modifications and variations in the details of the process and apparatus disclosed herein may be made without departing from the spirit and scope of the invention as defined by the claims appended hereto.

What is claimed is:

1. A process for freezing particulate granules of high water content food products, comprising the steps of:
   providing a freezing chamber having a feed inlet, an outlet and a perforated plate extending from said feed inlet to said outlet,
   oscillating said perforated plate,
   introducing a chilled gas through said perforated plate,
   delivering particulate granules of said food product to said feed inlet,
   oscillating and levitating said particulate food granules while simultaneously freezing said particulate food granules in said chilled gas,
   moving said particulate granules to said outlet by said oscillating movement in combination with the passage of said chilled gas through said perforated plate,
   recovering said frozen particulate food granules at said outlet,
   recovering chilled gas containing fines of said food, and separating said fines from said recovered chilled gas.

2. The process defined by claim 1, wherein said perforated plate includes a plurality of gas entry ports oriented in the direction of said freezing chamber outlet and further comprising introducing said chilled gas through said gas entry ports in the direction of said freezing chamber outlet.

3. The process defined by claim 2, further comprising introducing said chilled gas through said gas entry ports to levitate and move said particulate granules of said food product in the direction of said freezing chamber outlet.

4. The process defined by claim 1, wherein said high water content food product is cheese and said particulate granules are granules of said cheese.

5. The process defined by claim 4, wherein said food product includes at least one variety of mozzarella cheese.

6. The process defined by claim 1, wherein said high water content food product is comprised of at least one type of cheese and said particulate granules of cheese are moved from said feed inlet to said outlet with a residence time of between 3 and 10 minutes.

7. The process defined by claim 1 or claim 6, wherein the temperature of said chilling gas introduced through said perforated plate is maintained at a temperature between −20° C. and −50° C. and the temperature of the frozen particulate granules is maintained between −14° C. and −30° C.

8. The process defined by claim 1 or claim 6, wherein said perforated plate is oscillated at a rate greater than 200 cycles per minute.

9. The process as claimed in claim 1 including recycling at least some of said recovered chilled gas and passing such through said perforated plate.

10. The process as claimed in claim 1 carried out substantially continuously.

11. A process for freezing particulate granules of high water content food products comprising the steps of:
    providing a freezing chamber having a feed inlet, an outlet and a perforated bottom plate having gas entry ports oriented vertically and in the direction of said outlet,
    oscillating said freezing chamber,
    introducing a chilled gas through said gas entry ports of said perforated bottom plate in the direction of said outlet, delivering particulate granules of said food product to said feed inlet to provide a bed of said particulate food granules adjacent said perforated bottom plate, levitating and freezing said particulate food granules in said chilled gas while simultaneously oscillating said bed of particulate granules, moving said particulate granules in the direction of said outlet by the oscillating movement of said freezing chamber and the chilled gas introduced through said gas entry ports, recovering said frozen particulate food granules at said outlet, recovering chilled gas containing fines of said food, and separating said fines from said recovered chilled gas.

12. The process for freezing particulate granules of high water content food products as defined by claim 11, wherein said food product includes at least one type of cheese and further including the step of withdrawing said chilled gas from above said bed of particulate granules in said freezing chamber and recovering fine particles of said cheese entrained in said chilled gas.

13. An apparatus for freezing particulate granules of high water content food products comprising:

a freezing chamber having a feed inlet, an outlet and a perforated bottom plate extending from said feed inlet to said outlet, means for oscillating said perforated plate, a source of chilled gas, means for moving said chilled gas through said perforated plate, means for delivering particulate granules of said food product to said feed inlet to provide a bed of said particulate granules adjacent said perforated bottom plate, a fines separator, and means for withdrawing said chilled gas from above said bed of particulate granules in said freezing chamber and delivering said chilled gas to said fines separator, whereby said chilled gas levitates and freezes said particulate granules in said bed, said bed of particulate granules is moved toward said outlet by oscillating movement of said perforated plate, and fine particles of said particulate granules entrained in said chilled gas are separated from said gas and recovered in said fines separator.

14. The apparatus defined by claim 13, wherein said fines separator is a cyclone.

15. The apparatus defined by claim 13, wherein said perforated bottom plate includes a plurality of gas entry ports oriented to introduce said chilled gas into said freezing chamber to levitate said particulate granules and induce movement of said particulate granules toward said outlet whereby said particulate granules are moved toward said outlet by said chilling gas and said oscillating movement of said perforated plate.

16. The apparatus defined by claim 13, further including means for recovering said chilled gas from said fines separator and recirculating said chilled gas through said freezing chamber.

* * * * *

UNITED STATES PATENT AND TRADEMARK OFFICE
CERTIFICATE OF CORRECTION

PATENT NO. :   4,951,472

DATED      :   August 28, 1990

INVENTOR(S) :  HANSEN et al

It is certified that error appears in the above-identified patent and that said Letters Patent is hereby corrected as shown below:

On the cover page, Item [73], "Niro Atomizer, Inc.," should read --Niro Atomizer, Inc.
     A/S Niro Atomizer, Soborg, Denmark--.

Signed and Sealed this

First Day of September, 1992

Attest:

DOUGLAS B. COMER

Attesting Officer

Acting Commissioner of Patents and Trademarks